Figure 1:
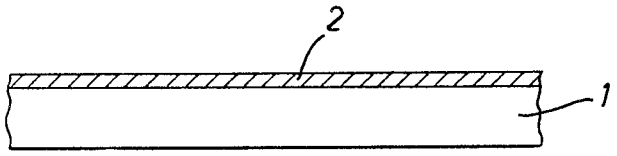
Figure 2:
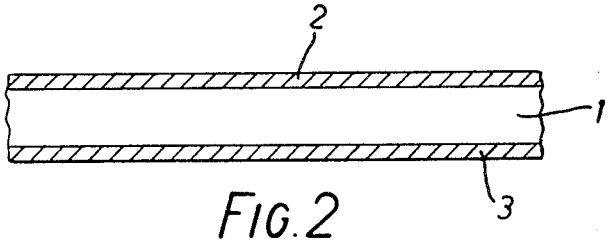

United States Defensive Publication [19] (H) [11] T955,009

Lansbury et al. [43] Feb. 1, 1977

[54] FILM-FORMING COMPOSITION

[76] Inventors: Robert Clive Lansbury, 1 Tithe Barn Close, St. Albans, Hertfordshire; Thomas Geoffrey Heggs, 14 Dolesbury Drive, Welwyn, Hertfordshire, both of England

[21] Appl. No.: 689,545

[22] Filed: May 24, 1976

[30] Foreign Application Priority Data

June 11, 1975 United Kingdom ..... 25011/75

[51] Int. Cl.[2] ..... B32B 27/08; B28B 3/20

[52] U.S. Cl. ..... 428/515; 428/910; 428/520; 428/36; 260/897 A; 264/DIG. 57; 264/176 R; 426/127

[57] ABSTRACT

There is disclosed a thermoplastic, film-forming composition comprising a blend of a. a propylene-ethylene copolymer, the propylene content of the copolymer being from 95 to 99.75% by weight of the copolymer, and b. a polymer of an alpha-olefin of 4 to 10 carbon atoms copolymerized with from 0 to 10% by weight of the copolymer of an alpha-olefin of 2 to 10 carbon atoms, the alpha-olefin polymer constituting from 41 to 90% by weight of the composition.

The propylene-ethylene copolymer preferably contains from 2 to 4% by weight of ethylene, and preferably, in granular form, exhibits a Melt Flow Index of from 10 to 200 g/10 minutes, measured according to ASTM/D1238-65T (Condition N).

The alpha-olefin component of the blend is suitably a polymer, preferably a homo-polymer, of butene-1, and suitably has a Melt Flow Index, by the aforementioned test, of less than 50 g/10 minutes, preferably between 5 and 40 g/10 minutes.

To ensure the production of films having acceptable optical characteristics, the alpha-olefin component preferably comprises from 45 to 65% by weight of the composition. Additives, such as pigments, anti-static agents, and the like, conventionally employed in film production, may be included in the composition, if desired.

The composition is suitably employed for the production of self-supporting films, and is particularly useful as a heat-sealable surface layer of a coextruded, biaxially oriented, multiple-layer film having a substrate layer of a propylene homo- or co-polymer. Such films are heat-sealable at comparatively low temperatures to provide strong heat seals, and are particularly suitable for the packaging of foodstuffs, and the like.

12 Claims, 1 Sheet Drawing,

35 Pages Specification

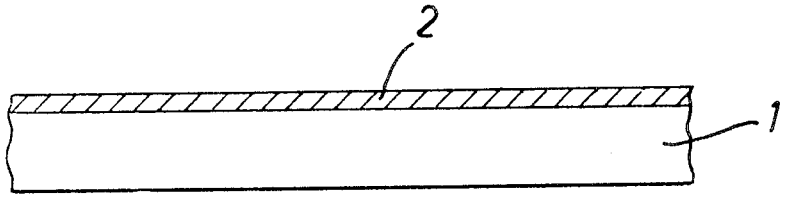

The file of this unexamined application may be inspected and copies thereof may be purchased (849 O.G. 1221, Apr. 9, 1968).